United States Patent
Ito et al.

(10) Patent No.: US 9,863,800 B2
(45) Date of Patent: Jan. 9, 2018

(54) RADAR LEVEL GAUGE (71) Applicant: TOKYO KEIKI INC., Tokyo (JP)

(72) Inventors: Satoshi Ito, Tokyo (JP); Masao Kishimoto, Tokyo (JP); Akira Hotta, Tokyo (JP)

(73) Assignee: TOKYO KEIKI INC., Tokyo (JP)

(*) Notice: Subject to any disclaimer, the term of this patent is extended or adjusted under 35 U.S.C. 154(b) by 249 days.

(21) Appl. No.: 14/780,497

(22) PCT Filed: Mar. 26, 2014

(86) PCT No.: PCT/JP2014/058574
§ 371 (c)(1),
(2) Date: Sep. 25, 2015

(87) PCT Pub. No.: WO2014/157356
PCT Pub. Date: Oct. 2, 2014

(65) Prior Publication Data
US 2016/0041023 A1  Feb. 11, 2016

(30) Foreign Application Priority Data
Mar. 29, 2013  (JP) ................. 2013-072204

(51) Int. Cl.
*G01F 23/284* (2006.01)
*H01Q 13/02* (2006.01)
(Continued)

(52) U.S. Cl.
CPC ............ *G01F 23/284* (2013.01); *H01P 5/087* (2013.01); *H01P 5/107* (2013.01); *H01Q 1/225* (2013.01); *H01Q 13/02* (2013.01)

(58) Field of Classification Search
CPC ...... G01F 23/284; H01Q 1/225; H01Q 13/02; H01P 5/107; H01P 5/087
See application file for complete search history.

(56) References Cited

U.S. PATENT DOCUMENTS 5,926,080 A  7/1999  Palan et al.
6,552,636 B1  4/2003  Yuanzhu
(Continued)

FOREIGN PATENT DOCUMENTS

CA  2 432 692 A1  7/2002
JP  S61-068520 A  4/1986
(Continued)

OTHER PUBLICATIONS

Japanese Office Action dated Sep. 6, 2016 with an English translation thereof.
(Continued)

*Primary Examiner* — John B Sotomayor
(74) *Attorney, Agent, or Firm* — McGinn IP Law Group, PLLC (57) ABSTRACT

A radar level gauge using electromagnetic signals is provided, which includes a connection arrangement for connecting a transmitter receiver circuit board and an antenna unit with one another, with which the horizontal size of the radar level gauge may be reduced and reflection and transmission losses may be suppressed as well. The transmitter receiver circuit board 32 is so disposed in a housing 12 as to extend vertically. The connection arrangement includes a waveguide sequence which is fed at a feed terminal 32*a* formed on the transmitter receiver circuit board 32 and composed of three waveguides W1 to W3. Specifically, the waveguide sequence includes, in sequential order from the transmitter receiver circuit board to the antenna unit: a circular waveguide W1 extending horizontally and perpendicular to the transmitter receiver circuit board; a rectangular waveguide W2 in connection with the circular waveguide W1 and extending vertically; and a second circular waveguide W3 further in connection with the rectangular waveguide W2 and extending vertically.

7 Claims, 4 Drawing Sheets (51) Int. Cl.
  *H01P 5/08*    (2006.01)
  *H01P 5/107*   (2006.01)
  *H01Q 1/22*    (2006.01)

(56) References Cited

U.S. PATENT DOCUMENTS

| | | | |
|---|---|---|---|
| 6,778,044 B2 | 8/2004 | Fehrenbach et al. | |
| 7,450,055 B2 | 11/2008 | Eriksson | |
| 2004/0099058 A1* | 5/2004 | Edvardsson | H01Q 1/22 |
| | | | 73/290 V |
| 2004/0108951 A1* | 6/2004 | Edvardsson | G01F 23/284 |
| | | | 342/124 |
| 2005/0083228 A1* | 4/2005 | Edvardsson | G01S 7/03 |
| | | | 342/124 |
| 2006/0000274 A1* | 1/2006 | Kallsand | G01F 23/284 |
| | | | 73/290 V |
| 2006/0158371 A1* | 7/2006 | Duivenvoorden | G01F 23/284 |
| | | | 342/124 |
| 2007/0236385 A1* | 10/2007 | Kleman | G01F 23/284 |
| | | | 342/124 |
| 2009/0289835 A1 | 11/2009 | Edvardsson | |
| 2010/0231438 A1* | 9/2010 | Ohlsson | G01F 25/0061 |
| | | | 342/124 |
| 2012/0007768 A1* | 1/2012 | Hemmendorff | G01F 23/284 |
| | | | 342/124 |
| 2012/0050125 A1 | 3/2012 | Leiba et al. | |
| 2012/0153969 A1 | 6/2012 | Eckert et al. | |
| 2016/0041023 A1* | 2/2016 | Ito | H01Q 1/225 |
| | | | 342/124 |

FOREIGN PATENT DOCUMENTS

| | | |
|---|---|---|
| JP | H 05-191303 A | 7/1993 |
| JP | 2001-036301 A | 2/2001 |
| JP | 2004-535693 A | 11/2004 |
| JP | 2006-038756 A | 2/2006 |
| JP | 2011-521257 A | 7/2011 |
| JP | 2012-167956 A | 9/2012 |

OTHER PUBLICATIONS

Korean Office Action dated Oct. 14, 2016 with an English translation thereof.
Extended European Search Report dated Oct. 17, 2016.
International Search Report (ISR) (PCT Form PCT/ISA/210), in PCT/JP2014/058574, dated Jul. 1, 2014.

* cited by examiner

RADAR LEVEL GAUGE

TECHNICAL FIELD

The present invention relates to a radar level gauge for measuring level of a measurement object by means of electromagnetic signals, and in particular, to a radar level gauge including a transmitter receiver circuit board accommodated in a housing, an antenna unit for transmitting and receiving electromagnetic signals, and a connection arrangement for connecting the transmitter receiver circuit board and the antenna unit with one another.

BACKGROUND OF THE INVENTION

A typical radar level gauge described above includes a transmitter receiver circuit board accommodated in a housing and having transmitter receiver circuitry mounted thereon, and an antenna unit extending vertically into a container, in which a measurement object is contained, in order to determine a level of a object by transmit electromagnetic signals and receive the reflected signals. For connecting the transmitter receiver circuit board and the antenna unit with one another, a connection arrangement is required.

A conventional connection arrangement for this purpose is known from Patent Document No. 1 listed below. This document describes a radar level gauge having a transmitter receiver circuit board so accommodated in a housing as to extend horizontally, a probe (or antenna unit), and a connector for connecting the housing and the probe with one another. The connector includes a central conductor, which has one end adapted for insertion into a hole formed in the transmitter receiver circuit board for a direct electrical contact with the circuit board, and the other end adapted for an electrical connection with the probe.

Since the radar level gauge of Patent Document No. 1 has the transmitter receiver circuit board so disposed as to extend horizontally, the level gauge disadvantageously occupies a relatively large horizontal area when mounted in position and it is difficult to minimize the horizontal size of the level gauge. It is, however, often required to mount a radar level gauge and some other devices side by side in the horizontal direction, close to each other, so that it is highly desired to minimize the horizontal size of radar level gauges. In addition, with this known radar level gauge, the position of the hole formed in the transmitter receiver circuit board for receiving one end of the central conductor is limited to be adjacent to the center of the circuit board, which disadvantageously leads to limited freedom in designing the transmitter receiver circuit board.

Patent Document No. 1 also shows another known radar level gauge, which is prior art to the above mentioned radar level gauge (See, FIG. 1 of the document). The prior art radar level gauge has a transmitter receiver circuit board so accommodated in a housing as to extend vertically, and a length of coaxial cable extends out of the circuit board. The tip end of the coaxial cable is adapted for connection with an antenna unit by means of a plug and socket connector pair. Patent Document No. 2 listed below describes a plug and socket connector pair suitable for this purpose. The plug and socket connector pair includes a plug to be connected to the tip end of the coaxial cable extending out of the transmitter receiver circuit board and a socket to be connected to a tip end of a coaxial line leading to the antenna unit. When the plug is inserted in the socket, an inner conductor of the plug and an inner conductor of the socket are brought into contact with each another while an outer conductor of the plug and an outer conductor of the socket are brought into capacitive coupling by means of a dielectric body, so that the transmitter receiver circuit board and the antenna unit are connected with one another while electrical isolation is provided between the ground of the transmitter receiver circuitry and the ground of the antenna.

Since the prior art radar level gauge shown in Patent Document No. 2 has the transmitter receiver circuit board so disposed as to extend vertically, the horizontal size of the radar level gauge may be minimized with ease. On the other hand, however, the use of the coaxial line disadvantageously tends to lead to relatively large transmission losses. In addition, the use of the coaxial line also disadvantageously tends to cause reflection of electromagnetic signals at the connection point (or the feed point) between the coaxial line and the antenna unit.

PRIOR ART DOCUMENTS

Patent Documents

Patent Document No. 1: United States Patent Publication No. U.S. Pat. No. 7,450,055
Patent Document No. 2: United States Patent Publication No. U.S. Pat. No. 6,778,044

SUMMARY OF THE INVENTION

Problems to be Solved by the Invention

The present invention has been achieved in view of the problems mentioned above. Accordingly, it is an object of the present invention to provide a radar level gauge including a connection arrangement for connecting a transmitter receiver circuit board and an antenna unit with one another, with which the horizontal size of the radar level gauge may be minimized and reflection and transmission losses may be suppressed as well.

Resolution

According to the present invention, the above object is achieved by a radar level gauge using electromagnetic signals to determine a level of a object, comprising: a transmitter receiver circuit board accommodated in a housing; an antenna unit for transmitting and receiving electromagnetic signals; and a connection arrangement for connecting the transmitter receiver circuit board and the antenna unit with one another; wherein the transmitter receiver circuit board is so disposed in the housing as to extend vertically; wherein the connection arrangement includes a waveguide sequence which is fed at a feed terminal formed on the transmitter receiver circuit board; and wherein the waveguide sequence includes, in sequential order from the transmitter receiver circuit board to the antenna unit: a circular waveguide extending horizontally and perpendicular to the transmitter receiver circuit board; a rectangular waveguide in connection with the circular wave guide and extending vertically; and a second circular waveguide further in connection with the rectangular waveguide and extending vertically.

The radar level gauge may further comprise a dielectric body which is disposed in the waveguide sequence at and over the boundary between the rectangular waveguide and the second circular waveguide.

The radar level gauge may further comprise an insulation dielectric body for electrically isolating a ground conductor of the transmitter receiver circuit board and the housing from one another, the insulation dielectric body being disposed at the boundary between the rectangular waveguide and the second circular waveguide and fitted over the dielectric body.

The dielectric body which is disposed in the waveguide sequence may have a first end portion disposed in the rectangular waveguide and a second end portion disposed in the second circular waveguide, the first and second end portions each being so shaped as to have a cross-section which is either continuously or stepwise decreasing toward an ultimate end thereof.

The radar level gauge may further comprise a radar absorbent material provided on a part of an outer circumferential surface of the dielectric body which is disposed in the waveguide sequence.

The dielectric body which is disposed in the waveguide sequence may be formed as a dielectric rod which has a proximal end portion with a rectangular cross-section and a distal end portion with a circular cross-section.

The transmitter receiver circuit board, the ground conductor of the transmitter receiver circuit board, the nonconductive casing and the dielectric rod are adapted to be sub-assembled into one unit before being inserted into the housing.

Advantages Provided by the Invention

According to the present invention, the transmitter receiver circuit board is so disposed in the housing as to extend vertically, so that the horizontal size of the radar level gauge may be minimized. In addition, the connection arrangement includes a waveguide sequence, in which the vertically extending transmitter receiver circuit board and the antenna unit are connected by means of the circular waveguide, the rectangular waveguide, and a second circular waveguide, so that transmission losses may be suppressed and reduced, and the propagation direction of the electromagnetic signals may be smoothly varied from horizontal to vertical.

The position of the feed terminal formed on the transmitter receiver circuit board is not necessarily required to be at the center of the circuit board. Rather, the feed terminal may be provided at any position on the transmitter receiver circuit board as long as the position of the circular waveguide and the position of the feed terminal correspond to each other, leading to enhanced freedom in selection of the position of the feed terminal on the transmitter receiver circuit board.

By virtue of the provision of the dielectric body disposed in the waveguide sequence at and over the boundary between the rectangular waveguide and the second circular waveguide, reflection at the transition point between the rectangular waveguide and the second circular waveguide may be advantageously suppressed. In addition, in the case where the insulation dielectric body is provided in order to achieve electrical isolation between the ground conductor of the transmitter receiver circuit board and the housing at the boundary between the rectangular waveguide and the second circular waveguide, leakage of electromagnetic signals from the waveguide sequence and reflection in the waveguide sequence may be advantageously suppressed.

EXEMPLARY MODE FOR CARRYING OUT THE INVENTION

Hereinafter, an embodiment of the present invention will be described with reference to the accompanying drawings.

Figure 1:
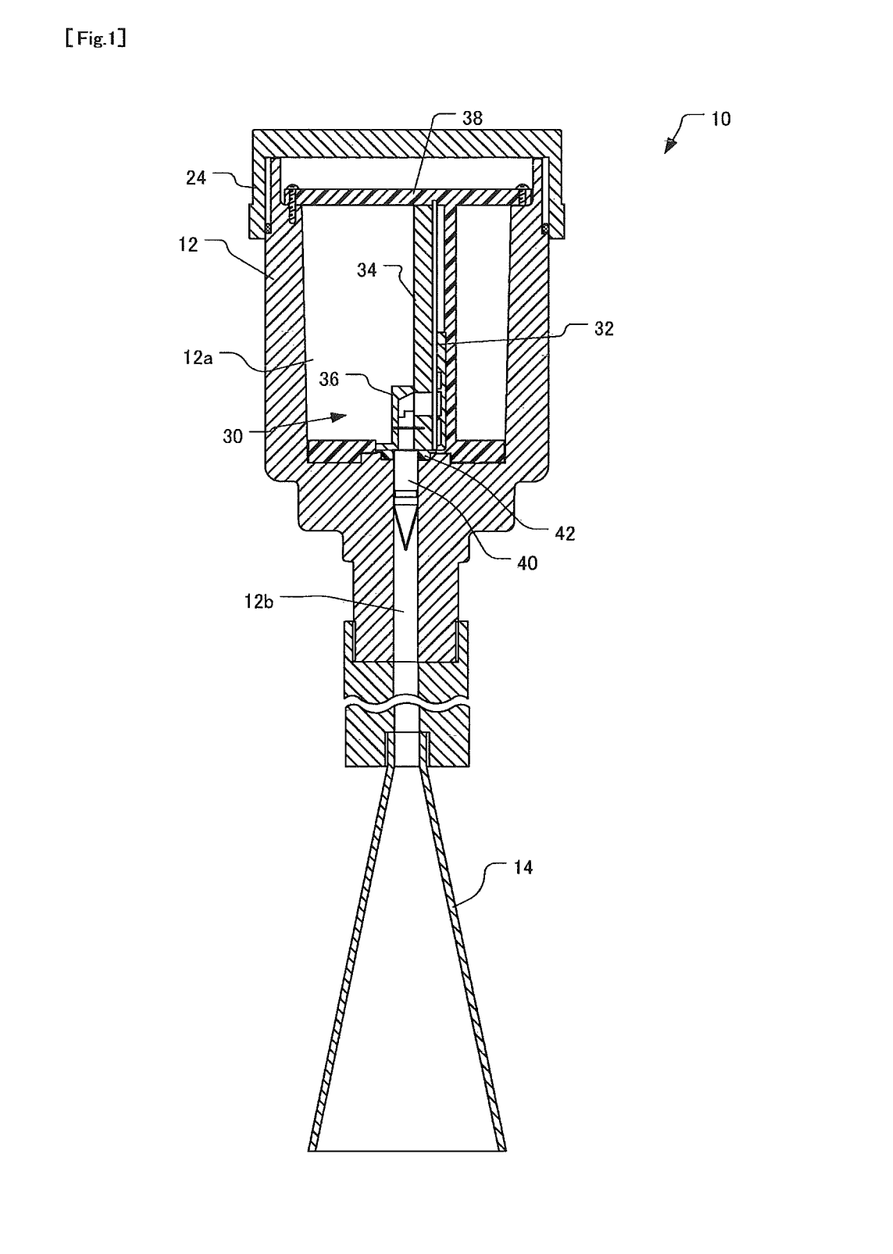
FIG. 1 is a schematic cross sectional view of a radar level gauge in accordance with an embodiment of the present invention.
Figure 2:
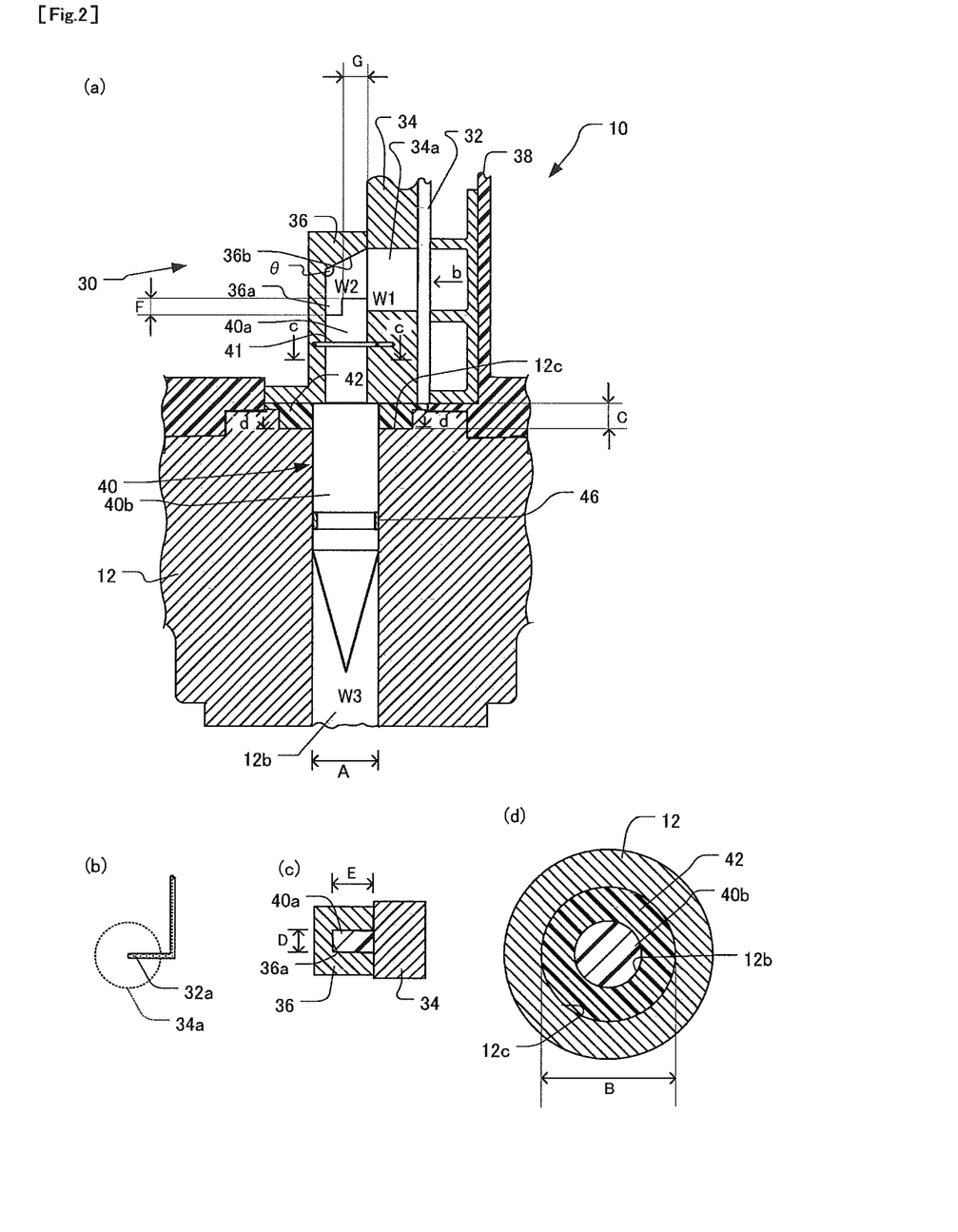
FIG. 2(a) is an enlarged view of a significant portion of the radar level gauge of FIG. 1.
FIG. 2(b) is a view as seen in direction of arrow b in FIG. 2(a).
FIG. 2(c) is a cross sectional view as seen along line c-c in FIG. 2(a).
FIG. 2(d) is a cross sectional view as seen along line d-d in FIG. 2(a).

In general, as shown in FIGS. 1 and 2, a radar level gauge 10 in accordance with an embodiment of the present invention includes a housing 12 forming an upper portion of the radar level gauge 10 and an antenna unit 14 forming a lower portion of the radar level gauge 10. The housing 12 is made of a metallic material. The antenna unit 12 transmits electromagnetic signals from a tip end (lower end) thereof toward a measurement object contained in a container. The traveling time of the transmitted electromagnetic signals reflected by the measurement object is measured to determine the distance between the radar level gauge 10 and the measurement object, and thus to determine the filling level of the measurement object in the container. In the following description, with regard to several elements disposed between the housing 12 and the antenna unit 14, a first end portion of the element that is adjacent to the housing 12 is referred to as the "proximal end portion" and a second end portion adjacent to the antenna unit 14 as the "distal end portion."

Figure 4:
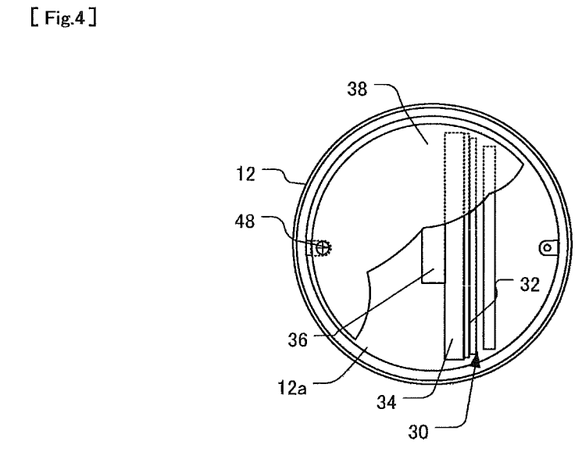
FIG. 4 is a plan view of a housing partially cut-out to show inside thereof.

The housing 12 defines a generally cylindrical inner space 12a, which has a central axis extending in vertical direction (See, FIGS. 1 and 4). The generally cylindrical inner space 12a has a bottom wall, in which a circular central hole 12b is formed. The circular central hole 12b has a circular cross-section of a diameter smaller than that of the generally cylindrical inner space 12a and is connected with the antenna unit 14. The generally cylindrical inner space 12a of the housing 12 has an open upper end, which is normally closed by a detachable cap 24.

In the generally cylindrical inner space 12a of the housing 12, a circuit unit 30 is accommodated. As seen from an expanded partial view shown in FIG. 2, the circuit unit 30 includes: a transmitter receiver circuit board 32 having transmitter receiver circuitry mounted thereon; a ground conductor 34 formed on a back surface of the circuit board 32; a conductive casing 36 attached to the back surface of the ground conductor 34 and serving as a second ground conductor; a nonconductive casing 38 at least partially enclosing the ground conductor 34 and the conductive casing 36; and a dielectric rod 40. The nonconductive casing 38 may be made, for example, of a plastic material. The circuit unit 30 may include one or more other circuit boards.

The transmitter receiver circuit board 32 has a micro strip line formed thereon. The micro strip line serves to transmit micro wave, and has a feed terminal 32a at one end thereof (FIG. 2(b)). The ground conductor 34 has a circular through-hole 34a at a position corresponding to the position of the feed terminal 32a. In addition, the conductive casing 36 has a rectangular groove 36a, which has a rectangular cross-section (FIG. 2(c)), formed in one of the surfaces of the conductive casing 36 that faces the back surface of the ground conductor 34. The rectangular groove has one end communicating with the circular through-hole 34a and the other end communicating with the circular central hole 12b of the housing 12.

With regard to the elements described above, a horizontally extending circular waveguide W1 is formed by the circular through-hole 34a, a vertically extending rectangular waveguide W2 is formed by the rectangular groove 36a, and a vertically extending circular waveguide W3 is formed by the circular central hole 12b (FIG. 2(d)). From these three waveguides W1, W2 and W3, a connection arrangement for connecting the transmitter receiver circuit board 32 and the antenna unit 14 is constructed.

The circular waveguide W1 and the rectangular waveguide W2 extend perpendicular to each other. In order to achieve impedance matching between these two waveguides W1 and W2, the proximal end portion of the rectangular groove 36a has an end wall surface 36b, which is so formed as to extend not perpendicular to the longitudinal axis of the rectangular groove 36a but somewhat oblique thereto. In other words, the rectangular groove 36a has an oblique end wall surface 36b at its proximal end portion. The oblique end wall surface 36b contributes to a smooth transmission of electromagnetic signals from the circular waveguide W1 to the vertical rectangular waveguide W2. By interposing the rectangular waveguide W2 having the oblique end wall surface 36b between the two circular waveguides W1 and W3, the electromagnetic signals transmission between the circular waveguides W1 and W3 may be achieved more efficiently than in the case where the two circular waveguides W1 and W3, which extend perpendicular to each other, would be directly connected with one another.

The dielectric rod 40 is inserted in the waveguide sequence composed of the three waveguides W1, W2 and W3, such that a partial length of the waveguide sequence is filled up with a dielectric material. The dielectric rod 40 may be preferably made of a chemically resistant material, such as polytetrafluoroethylene(PTFE), tetrafluoroetylene perfluoroalkylvinylether copolymer (PFA), or others.

The dielectric rod 40 has a proximal end portion 40a formed to have a rectangular cross-section corresponding to that of the rectangular groove 36a and adapted for insertion into the rectangular waveguide W2. In addition, the dielectric rod 40 has a distal end portion 40b formed to have a circular cross-section corresponding to that of the circular central hole 12b of the housing 12 and adapted for insertion into the circular waveguide W3 up to a certain point of the latter.

Figure 3:
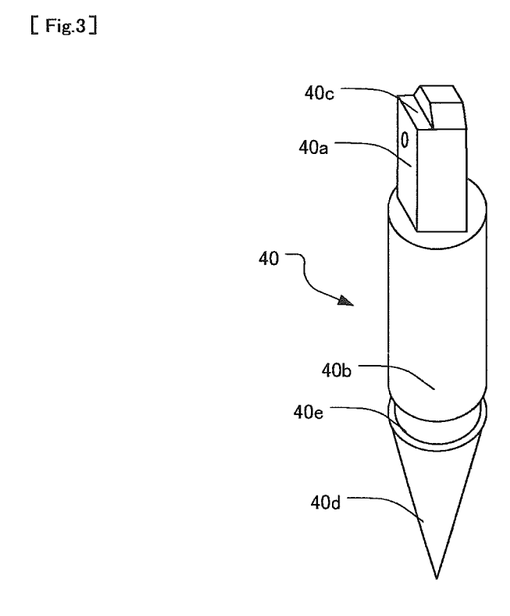
FIG. 3 is a perspective view of a dielectric rod.

As shown in FIG. 3, the proximal end portion 40a of the dielectric rod 40 has a tip end so formed as to have a shoulder 40c, which is formed as a result of formation of a cutout. The portion of the tip end that is more proximal than the shoulder 40c is so shaped as to gradually reduce width toward the ultimate end thereof. By virtue of the shape of the tip end of the proximal end portion 40a of the dielectric rod 40, together with the shape of the oblique end wall surface 36b of the rectangular groove 36a, impedance matching at two discontinuity points, one between the circular waveguide W1 and the rectangular waveguide W2 and the other at the proximal end portion 40a of the dielectric rod 40, may be achieved, leading to reduced reflection at the discontinuity points.

The distal end portion 40b of the dielectric rod 40 has a tip end so formed as to be a cone shaped portion 40d, which gradually reduces diameter toward the ultimate end thereof. By virtue of the shape of the tip end of the distal end portion 40b of the dielectric rod 40, impedance matching at the distal end portion 40b of the dielectric rod 40, which is a discontinuity point, may be achieved, leading to reduced reflection at the discontinuity point.

The distal end portion 40b of the dielectric rod 40 has an outer circumferential surface, in which a circumferential groove 40c is formed. The circumferential groove 40 receives a sheet (or tape) of a radar absorbent material (FIG. 2).

Figure 5:
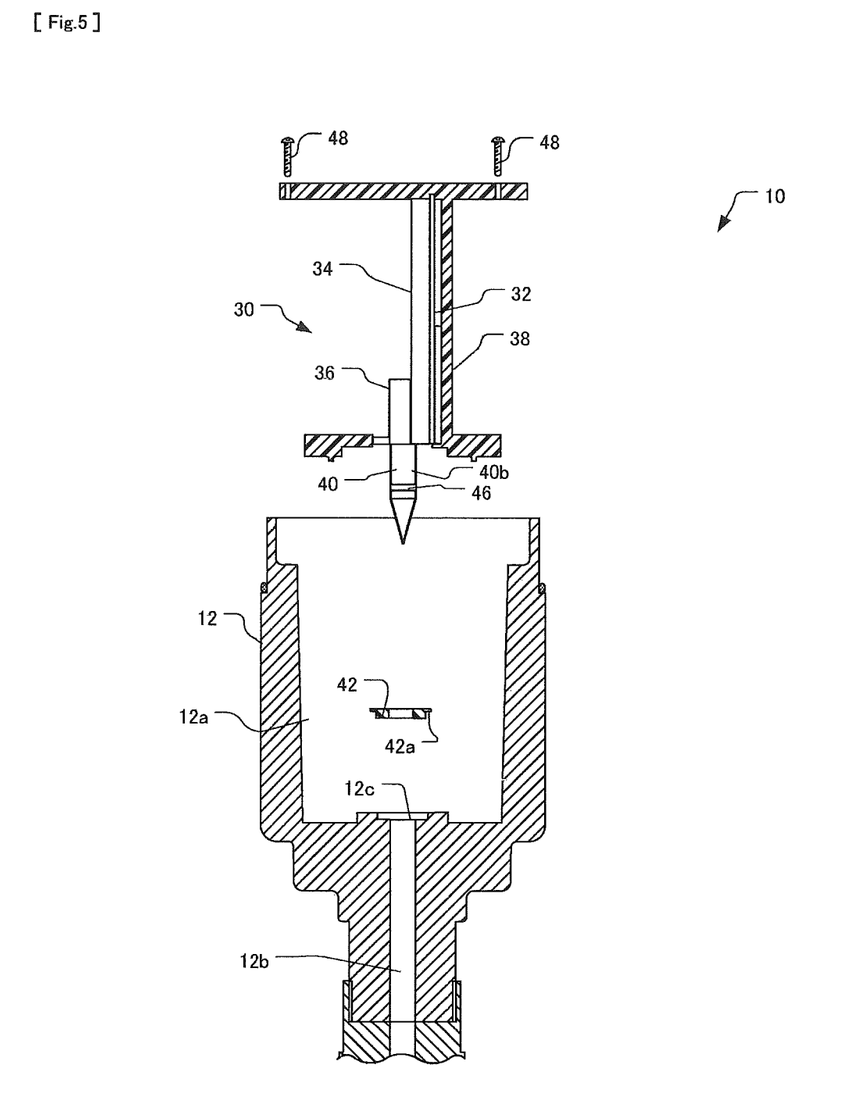
FIG. 5 is an exploded sectional view of the radar level gauge for illustrating installation of a circuit unit into the housing.

The dielectric rod 40 is prevented from detachment from the circuit unit 30 by means of a detachment prevention pin 41 extending through the dielectric rod 40 and engaging with the ground conductor 34 and the conductive casing 36. The proximal end portion 40a of the dielectric rod 40 is enclosed by the combination of the conductive casing 36 and the ground conductor 34, while the distal end portion 40b extends out of the circuit unit 30 (FIG. 5). Any suitable detachment prevention means may be used in place of the detachment prevention pin 41, in order to prevent detachment of the dielectric rod 40 from the circuit unit 30.

The nonconductive casing 38 is used for preventing both the ground conductor 34 of the circuit unit 30 and the conductive casing 36 from direct electrical contact with the housing 12. The nonconductive casing 38 is directly attached and secured to the housing 12, while the circuit unit 30 accommodated in the generally cylindrical inner space 12a of the housing 12 is indirectly secured to the housing 12 by means of the nonconductive casing 38, whereby the transmitter receiver circuit board 32, the ground conductor 34, and the conductive casing 36 are so-disposed in the generally cylindrical inner space 12a as to extend vertically. More specifically, the circuit-unit 30 is so disposed in the generally cylindrical inner space 12a as to occupy such a spatial area within the generally cylindrical inner space 12a that lies in or adjacent a plane containing the central axis of the generally cylindrical inner space 12a, leading to efficient use of the generally cylindrical inner space 12a (FIG. 4).

The bottom wall of the generally cylindrical inner space 12a has a circular recess 12c formed around the circular central hole 12b, in which a disk-shaped isolation dielectric plate 42 is received. By means of the isolation dielectric plate 42, the ground conductor 34 and the housing 12 are prevented from direct electrical contact with each other, and rather, the ground conductor 34 and the housing 12 are coupled with each other solely by capacitive coupling. The isolation dielectric plate 42 may be made of PTFE, PFA, or a combination of such materials, and may be formed as a one-piece part or a combination of two or more parts.

In the embodiment shown in the drawings, the isolation dielectric plate 42 has a stepped outer circumferential surface. In other words, it has a flange 42a extending radially outward beyond the diameter of the circular recess 12c. The dielectric rod 40 is so disposed as to extend through the isolation dielectric plate 42. Thus, the isolation dielectric plate 42 is disposed at the boundary between the rectangular waveguide W2 and the circular waveguide W3. With appropriate adjustment of the geometry of the isolation dielectric plate 42, impedance matching and thus suppression of reflection at this boundary may be achieved by cooperation of the isolation dielectric plate 42 and the dielectric rod 40.

It is preferable to make adjustment of the geometry of each element described above depending on the frequency of electromagnetic signals to be used. With regard to the geometry of each element, FIG. 2 shows reference characters A to G, where: A stands for the diameter of the circular cross-section of the distal end portion 40b of the dielectric rod 40; B stands for the diameter of the portion of the isolation dielectric plate 42 that is inserted in the circular central hole 12b; C stands for the thickness of the isolation dielectric plate 42; D and E stand for the lengths of the shorter and longer sides, respectively, of the rectangular cross-section of the proximal end portion 40a of the dielectric rod 40; F stands for the length in the vertical direction of the cutout of the proximal end portion 40a of the dielectric rod 40; and G stands for the thickness of the residual portion of cutout of the proximal end portion 40a of the dielectric rod 40. Using these reference characters, it is preferable that: the ratio B/A is in the range of 1.6 to 2.4; the ratio C/A is in the range of 0.3 to 0.6; the ratio D/A is in the range of 0.5 to 0.8; the ratio E/A is in the range of 0.6 to 0.9; the ratio F/A is in the range of 0.2 to 0.4; and the ratio G/A is in the range of 0.3 to 0.5. In addition, it is preferable that the slant angle θ of the oblique end wall surface 36b of the rectangular groove 36a is greater than 90 degrees and not greater than 135 degrees.

The circuit unit 30 is installed into the housing 12 in accordance with the following process. As shown in FIG. 5, first of all, the isolation dielectric plate 42 is introduced into the housing 12 through the upper open end of the housing 12 and inserted into the circular recess 12c formed in the bottom wall of the generally cylindrical inner space 12a. Then, the circuit unit 30, which has been already sub-assembled, is inserted from top into the housing 12, when the distal end portion 40b of the dielectric rod 40 extending out of the circuit unit 30 is aligned with and inserted into the circular central hole 12b of the housing 12. Then, the nonconductive casing 38 of the circuit unit 30 is secured to the housing 12 by means of, for example, screws 48. When the above is completed, the transmitter receiver circuit board 32 accommodated in the housing 12 and the antenna unit 14 are connected with one another, while both of the ground conductor 34 and the conductive casing 36 are prevented from direct electrical contact with the housing 12 by means of the isolation dielectric plate 42 and the nonconductive casing 38.

Since the elements of the circuit unit 30 are sub-assembled into a unit before the circuit unit 30 is inserted into the generally cylindrical inner space 12a of the housing 12, the circuit unit 30 may be installed into the housing 12 with ease, in which the transmitter receiver circuit board 32 is so disposed as to extend vertically.

The antenna unit 14 is in mechanical connection with the housing 12 and in electrically connection with the second circular waveguide W3 formed by the circular central hole 12b of the housing 12. The antenna unit 14 may be of any suitable type. In the embodiment shown in the drawings, the antenna unit 14 includes a horn antenna, but is not limited thereto, and may include a rod antenna, for example.

In the radar level gauge having the above arrangement, the circular waveguide W1 is fed at the feed terminal 32a on the transmitter receiver circuit board 32 having transmitter receiver circuitry mounted thereon, and the electromagnetic signals propagates from the circular waveguide W1 to the rectangular waveguide W2, and then to the circular waveguide W3, so as to be radiated from the antenna unit 14.

With the arrangement described above, the feed terminal 32a on the transmitter receiver circuit board 32 and the antenna unit 14 are connected by means of the waveguide sequence, so that transmission losses may be suppressed and reduced. Further, by virtue of the combination of the circular waveguide W1, W3 and the rectangular waveguide W2, the propagation direction of the electromagnetic signals may be smoothly varied from horizontal to vertical.

In addition, the transmitter receiver circuit board 32 having transmitter receiver circuitry mounted thereon, as well as the ground conductor 34, is so disposed as to extend vertically, so that the horizontal size of the radar level gauge may be minimized.

The position of the feed terminal 32a formed on the transmitter receiver circuit board 32 is not necessarily required to be at the center of the circuit board 32. Rather, the feed terminal 32a may be provided at any position on the transmitter receiver circuit board 32 as long as the positions of the circular waveguide W1 formed by the circular through-hole 34a and the position of the feed terminal 32a correspond to each other, leading to enhanced freedom in selection of the position of the feed terminal 32a on the transmitter receiver circuit board 32.

The radar level gauge may be rated as explosion proof, which is ensured by the provision of (i) the dielectric rod 40 disposed at and around the transition point between the rectangular waveguide W1 and the second circular waveguide W3 and (ii) the isolation dielectric plate 42 fitted over the dielectric rod 40 for electrical isolation between the ground conductor 34 and the housing 12. The ground conductor 34 is grounded separately from the housing 12 by means of a dedicated ground line (not shown). Because the electromagnetic signals passing across the boundary between the rectangular waveguide W1 and the circular waveguide W2 is confined within the dielectric rod 40, more suppression of reflection and leakage of the electromagnetic signals can be achieved than in the case where the waveguides W1 and W2 would have no dielectric material but only air loaded therein. In addition, since the dielectric rod 40 contributes to prevention of reflection and leakage of the electromagnetic signals at that boundary, the isolation dielectric plate 42 may be designed to have a relatively large thickness, so that enhanced isolation may be achieved.

The proximal end portion 40a of the dielectric rod 40 is so shaped as to have a cross-section which is stepwise decreasing toward the ultimate end thereof, while the distal end portion 40b of the dielectric rod 40 is so shaped as to have a cross-section which is continuously decreasing toward the ultimate end thereof. These shapes of the proximal and distal end portions 40a and 40b contribute to prevention of reflection of electromagnetic signals, which could otherwise be caused due to the end portions 40a and 40b. Further, any possible, higher-order mode reciprocal propagation of electromagnetic signals within the dielectric rod 40 may be suppressed by the radar absorbent material 46 provided in the groove formed in the outer circumferential surface of the dielectric rod 40.

LIST OF REFERENCE NUMERALS

10 Radar level gauge
12 Housing
14 Antenna unit
30 Circuit unit
32 Transmitter receiver circuit board
32a Feed terminal
34 Ground conductor
38 Nonconductive casing
40 Dielectric rod
42 Isolation dielectric plate
46 Radar absorbent material
W1 Circular wave guide
W2 Rectangular wave guide
W3 Circular wave guide

What is claimed is:

1. A radar level gauge using electromagnetic signals to determine a level of an object, comprising:
   a transmitter receiver circuit board accommodated in a housing;
   an antenna unit for transmitting and receiving electromagnetic signals; and
   a connection arrangement for connecting the transmitter receiver circuit board and the antenna unit with one another;
   wherein the transmitter receiver circuit board is so disposed in the housing as to extend vertically;
   wherein the connection arrangement includes a waveguide sequence which is fed at a feed terminal formed on the transmitter receiver circuit board; and
   wherein the waveguide sequence includes, in sequential order from the transmitter receiver circuit board to the antenna unit: a circular waveguide extending horizontally and perpendicular to the transmitter receiver circuit board; a rectangular waveguide in connection with the circular waveguide and extending vertically; and a second circular waveguide further in connection with the rectangular waveguide and extending vertically.

2. A radar level gauge according to claim 1, further comprising:
   a dielectric body which is disposed in the waveguide sequence at and over a boundary between the rectangular waveguide and the second circular waveguide.

3. A radar level gauge according to claim 2, further comprising:
   an insulation dielectric body for electrically isolating a ground conductor of the transmitter receiver circuit board and the housing from one another, the insulation dielectric body being disposed at the boundary between the rectangular waveguide and the second circular waveguide and fitted over the dielectric body.

4. A radar level gauge according to claim 2, wherein:
   the dielectric body which is disposed in the waveguide sequence has a first end portion disposed in the rectangular waveguide and a second end portion disposed in the second circular waveguide, the first and second end portions each being so shaped as to have a cross-section which is either continuously or stepwise decreasing toward an ultimate end thereof.

5. A radar level gauge according to claim 2, further comprising:
   an electromagnetic signals absorption element provided on a part of an outer circumferential surface of the dielectric body which is disposed in the waveguide sequence.

6. A radar level gauge according to claim 2, wherein:
   the dielectric body which is disposed in the waveguide sequence is formed as a dielectric rod which has a proximal end portion with a rectangular cross-section and a distal end portion with a circular cross-section.

7. A radar level gauge according to claim 6, wherein:
   the transmitter receiver circuit board, a ground conductor of the transmitter receiver circuit board, a nonconductive casing and the dielectric rod are adapted to be sub-assembled into one unit before being inserted into the housing.

* * * * *